United States Patent
McGlothlin et al.

(10) Patent No.: US 7,294,678 B2
(45) Date of Patent: Nov. 13, 2007

(54) THIN WALLED POLYNITRILE OXIDE CROSSLINKED RUBBER FILM PRODUCTS AND METHODS OF MANUFACTURE THEREOF

(75) Inventors: Mark W. McGlothlin, San Diego, CA (US); Whitney A. Williams, Solana Beach, CA (US); Scott W. Herrick, San Diego, CA (US)

(73) Assignee: Regent Medical Limited, Manchester (GB)

( * ) Notice: Subject to any disclaimer, the term of this patent is extended or adjusted under 35 U.S.C. 154(b) by 334 days.

(21) Appl. No.: 11/045,938

(22) Filed: Jan. 28, 2005

(65) Prior Publication Data

US 2006/0173137 A1 Aug. 3, 2006

(51) Int. Cl.
*C08C 19/22* (2006.01)
*C08F 36/08* (2006.01)

(52) U.S. Cl. .............. 525/331.9; 525/332.5; 525/333.1; 525/377; 526/348.1

(58) Field of Classification Search ............. 525/331.9, 525/332.5, 333.1, 377
See application file for complete search history.

(56) References Cited

U.S. PATENT DOCUMENTS

| | | | |
|---|---|---|---|
| 3,390,204 A | 6/1968 | Breslow et al. | |
| 5,039,750 A | 8/1991 | Miller et al. | |
| 5,458,588 A | 10/1995 | Amdur et al. | |
| 5,736,748 A | 4/1998 | Lysenko et al. | |
| 5,872,173 A | 2/1999 | Anand | |
| 6,252,009 B1 | 6/2001 | Breton et al. | |
| 6,329,444 B1 | 12/2001 | McGlothlin et al. | |
| 6,355,826 B1 | 3/2002 | Parker | |
| 6,753,355 B2* | 6/2004 | Stollmaier et al. ............ 521/65 |
| 6,775,848 B2 | 8/2004 | McGlothlin et al. | |
| 2004/0071909 A1 | 4/2004 | McGlothlin et al. | |

FOREIGN PATENT DOCUMENTS

RU 2042664 C1 8/1995
WO WO-97/03034 A2 1/1997

OTHER PUBLICATIONS

Boiko and Grinev, "Influence of Mesitylene Dinitrile Oxide on the Processing Properties of Elastomer Compositions", *International Polymer Science and Technology*, vol. 22, No. 5, 1995, 21-23.

Boiko et al., "Rheological Properties of Solutions of Diene Elastomers With Mesitylene Dinitrile Oxide", *International Polymer Science and Technology*, vol. 20, No. 6, 1993 (51-53).

Evans et al., "Microencapsulated Antidegradants For Extending Rubber Lifetime", *The Goodyear Tire & Rubber Company Meeting*, vol. 65, 1991, (201-210).

Vlasyuk et al., "Chemical and Toxicological health studies of Elastomer Compositions Containing Dinitrile Oxide", *International Polymer Science and Technology*, vol. 23, No. 7, 1996 (44-45).

\* cited by examiner

*Primary Examiner*—Roberto Rabago
(74) *Attorney, Agent, or Firm*—Darby & Darby

(57) ABSTRACT

Natural rubber and/or synthetic polyisoprene film products having enhanced tear strength and tensile strength crosslinked with a one polynitrile oxide, intended for direct or indirect contact with living tissue or fluids to be placed in living organisms.

9 Claims, 1 Drawing Sheet

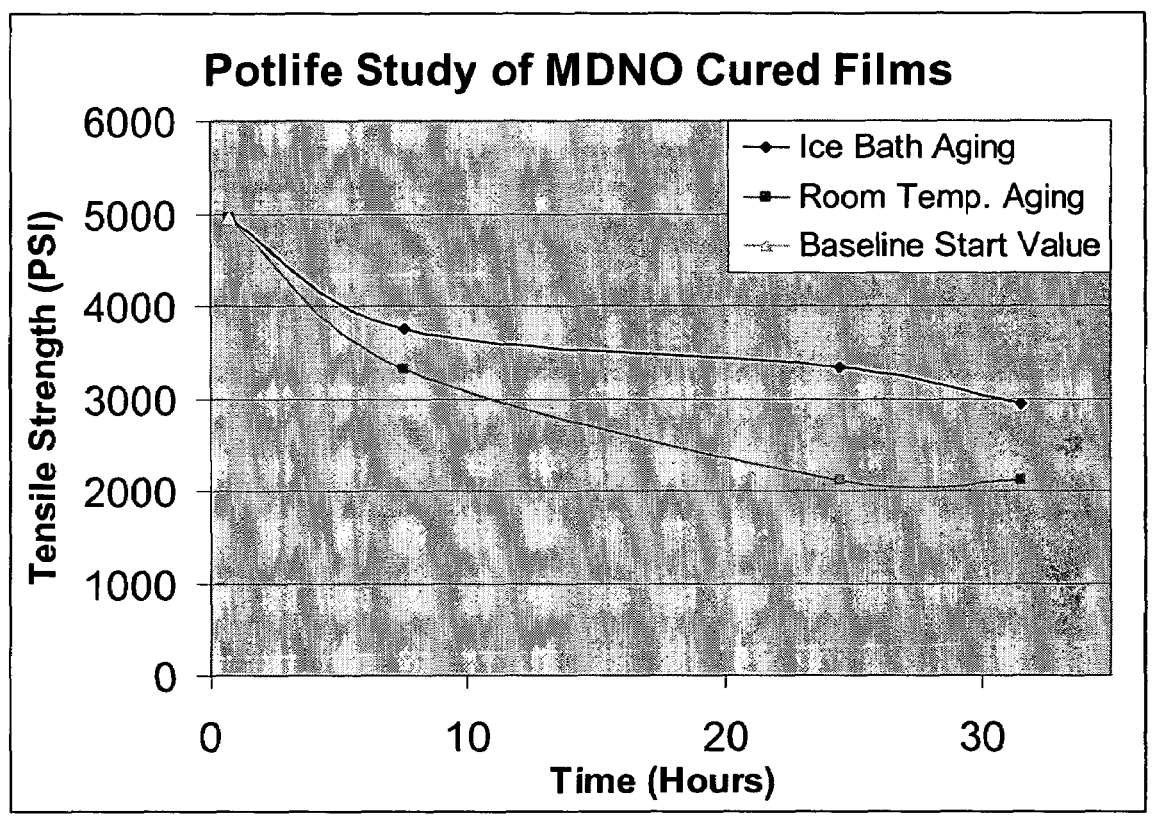
FIGURE

THIN WALLED POLYNITRILE OXIDE CROSSLINKED RUBBER FILM PRODUCTS AND METHODS OF MANUFACTURE THEREOF

FIELD OF THE INVENTION

This invention relates to thin walled rubber film products, and particularly those that are made from natural rubber and polyisoprene latices, vulcanized with polynitrile oxides.

BACKGROUND OF THE INVENTION

Thin walled natural rubber and synthetic polyisoprene film products intended for medical uses or other contact with human tissue are advantageously made of vulcanizates with a certain combination of properties. In most cases, it is desirable to combine a relatively low 100%, 300% or 500% tensile modulus with very high ultimate tensile strength and ultimate elongation values, and with high tear strength properties. Rubber products that may benefit from such enhanced tensile properties include, for example, medical gloves, condoms, male external urinary drainage catheters, surgical tubing, contraceptive diaphragms, finger cots, catheter balloons and cuffs, uterine thermal ablation balloons, drug infusion bladders, tissue retrieval pouches, medical tubing, baby bottle nipples, infant pacifiers, anesthesia breather bags, resuscitation bags, rubber dental dams, exercise bands and surgical tubing.

With respect to surgical gloves, it is important to have low 100% tensile modulus values, combined with high tensile strength. This is a difficult combination to achieve, as the lower modulus usually produces a lower tensile strength material. A relatively low tensile modulus is necessary to ensure that such gloves remain comfortable during use. If the tensile modulus is too high, the user's hands may become fatigued over time as progressively more strength is required to stretch the glove material. This is particularly problematic with gloves that are to be used for a prolonged period of time such as for a long surgical procedure. A combination of low modulus with high tensile strength is necessary to provide such desired comfort along with a very large safety margin with respect to glove failure.

Low tensile modulus values are also important in condoms to promote ease of donning, and in catheter balloons where ease of inflation is beneficial. A low tensile modulus is also of value in elastomeric drug infusion bladders, making it easier to fill the bladder with a drug solution.

Another tensile property affecting the usefulness of certain thin walled medical and personal film products is tear strength, important for preventing premature failure. Baby bottle nipples and baby pacifiers benefit from high tear strength since this prevents the child's teeth from severing the nipple or pacifier during use For catheter balloons, it is very important to combine high tear strength with high elongation to protect the balloon from bursting during use. For condoms, the combination of exceptionally high tear strength and tensile strength combined with high ultimate elongation is very desirable. For exercise bands, it is desirable to have very high ultimate elongation, combined with high tensile strength. Because exercise bands are often packed for travel and can impart unpleasant odors to packed clothing, it is very advantageous to have a band with very low odor.

With respect to rubber dental dams, it is very important to combine very high elongation with very high tensile strength to allow for the placement of the rubber dam over and around a tooth without risk of failure by tearing. Also it is very desirable for dental dams to have low levels of odor and taste.

Many rubber products must meet certain standards in order to be marketed. For example, medical devices, such as surgical gloves, examination gloves and condoms must meet the tensile strength, ultimate elongation and tactility standards of the American Society for Testing and Materials (ASTM). The ASTM has established Standard D3577-88 for rubber surgical gloves, D3578-77 for examination gloves, and D3492-83 for condoms. Each of these standards establishes a minimum ultimate tensile strength for the specified product under particular conditions. The minimum ultimate tensile strength specified for Type I (natural latex) surgical gloves in ASTM D3577-88 is 24 MPa. The minimum ultimate tensile strength specified for Type II (Synthetic rubber latex or rubber cement) surgical gloves in ASTM D3577-88 is 17 MPA. For condoms in ASTM D3492-83, a minimum of 17 MPA is required. The minimum ultimate tensile strength specified for natural rubber examination gloves in ASTM D3578-00 is 14 MPA. The ASTM standards also establish maximum deformation stress at 500 percent elongation.

Natural and synthetic rubber have been used extensively as materials for thin walled medical and personal film products. The highest durability and flexibility are provided by a rubber film that is seamless and of uniform thickness. This is best achieved when the thin walled rubber products are made by dip-molding and/or casting of the film. Dip-molding and/or casting of rubber is performed with either a latex (an aqueous dispersion of rubber particles) or an organic solution of the rubber. Dip-molding in either the latex or the organic solution is followed by removal of the water or solvent; the dipping and water or solvent removal are often performed in repeated cycles to achieve a particular film thickness. The film thus formed is then vulcanized to bring the rubber to a fully cured state. Latex can be processed without breaking down the molecular weight of the rubber, whereas dry-rubber methods, which utilize high shear to comminute the rubber and combine it with other compounding ingredients for processing, tend to degrade the molecular weight.

It is generally known that rubbers that are crosslinked only through carbon-carbon bonds have inferior tear strengths as compared with rubbers that contain sulfidic and/or polysulfidic crosslinks. Vulcanization, particularly with sulfur, has traditionally been performed in the presence of vulcanization accelerators. The most widely used accelerators are those that contain secondary amino groups, such as dialkylamino groups, cycloalkylamino groups, and morpholinyl groups. Secondary amino groups are found, for example, among the traditional sulfenamide, dithiocarbamate and thiuram accelerators. An unfortunate consequence of the inclusion of these accelerators is their tendency to produce an adverse reaction in individuals with whom the resulting rubber articles may come into contact. The reaction is commonly referred to as a Type IV allergy, which is mediated by T cells, generally occurs within six to 48 hours of contact with the rubber article, and is localized in the area of the skin where contact is made. Secondary amine-containing accelerators are also referred to as nitrosatable amines since they are susceptible of reaction with atmospheric nitrogen oxides during mixing, milling, extrusion, molding, calendaring, curing, and even warehousing and storage, to produce nitrosamines, which have been identified as potential human carcinogens.

Typically, sulfur vulcanization in the absence of an accelerator leads to rubber products with undesirable tensile properties. It would be advantageous to perform accelerator free vulcanization while achieving optimal strength of the rubber product thus produced.

Because of the disadvantages of the sulfur vulcanization process, it has become important to develop crosslinking methods that provide useful tensile properties with minimal toxicological properties. Crosslinking agents that provide rubber vulcanizates 1) free of reaction byproducts, 2) without the need for accelerating agents, and 3) through a low temperature curing protocol, while maintaining practical physical properties would be invaluable. Polynitrile oxides (PNOs) react readily with unsaturated molecules because they participate in a 1,3-dipolar cycloaddition with a variety of multiple bond functional groups. In the reaction of a PNO with ethylenic points of unsaturation, the cycloaddition product is an isoxazoline ring. Reaction of a rubber compound with a PNO therefore provides crosslinking regions within the polymer comprised of two or more isoxazoline units, usually separated by an aromatic structure.

The high reactivity of PNOs allows for crosslinking to occur at lower temperatures than with other non-accelerated vulcanization reagents and without the formation of byproducts (i.e., virtually all atoms of the reactants are incorporated into the rubber structure). These advantages of PNO reactivity has cultivated interest in their use as crosslinking agents for a variety of elastomeric polymers.

For example, the use of polynitrile oxides (PNOs) as low temperature crosslinking agents for various types of unsaturated rubber and other polymeric materials is known. Breslow, et al. in U.S. Pat. No. 3,390,204 disclose the use of various polynitrile oxides to crosslink unsaturated polymers. Possible articles of manufacture from such vulcanizates are also listed, and include items such as tires for motor vehicles, tubing, and pipes. Breslow specifically states that the cross-linked polymers are hard, tough resins. The only physical property disclosed by Breslow is the higher tensile strength of the vulcanizates as compared with the non-vulcanized starting rubber.

Lysenko, et al. in WO 97/03034 disclose the use of a dispersion of stable polynitrile oxides useful in latex materials. Specifically, the use of 2,4,6-triethylbenzene-1,3-dintrile oxide (TON-2) is cited as a useful one part room temperature crosslinking agent for latices. Lysenko also notes the utility of TON-2 for crosslinking various polymers to create useful one-part coatings. There is no mention of TON-2 or other polynitrile oxides imparting any special physical properties to articles of manufacture. No physical properties of articles or coatings made with TON-2 are disclosed.

Stollmaier, et al. in U.S. Pat. No. 6,753,355 references the utility of TON-2 for crosslinking various latex polymers for producing foam rubber articles, including flooring, wall covering, shoe lining, and non-woven materials. Polyisoprene is listed as one of a number of potential latices from which foam rubber backings can be made with the use of TON-2. Only foam containing products are disclosed as articles of manufacture.

Parker in U.S. Pat. No. 6,355,826 discloses an improved method of synthesizing mesitylene dinitrile oxide (MDNO). Parker cites the use of MDNO and other polynitrile oxides in the coating of fabrics with rubber-based coatings. Parker states that stable nitrile oxides are desirable from the perspective of handling, as compared to unstable polynitrile oxides. The Parker patent contains an extensive list of references to prior uses of MDNO and other polynitrile oxides, which are incorporated herein by reference.

Breton, et al. in U.S. Pat. No. 6,252,009 discloses the use of polynitrile oxides for making highly solvent resistant thermoplastic vulcanizates. V. V Boiko and I. V. Grinev, "Influence of MDNO/Processing Elastomers," International Polymer Science and Technology, vol. 22, No. 7, T/21, 1995 cite the utility of MDNO for increasing the Mooney viscosity of a synthetic polyisoprene rubber during solid rubber milling operations.

M. G. Vlasyuk, et al. in "Chemical and toxicological health studies of elastomer compositions containing dinitrile oxide" International Polymer Science and Technology, 23, No. 7, 1996 discloses the use of fabric coated with a solvent solution of synthetic polyisoprene vulcanized with MDNO. The toxicological properties of the coated fabric are revealed. No physical properties of the coating itself or of the coated fabric are provided. Latex is not used. Unsupported films are not disclosed.

Russian Patent SU 2,042,664 discloses the physical properties of various polymers cured with bis-nitrile oxide. Attention is given to those polymers of very low unsaturation, including butyl rubber, urethane rubber, polysiloxane rubber and ethylene propylene rubber. These polymers are generally difficult to crosslink, and MDNO is thought to provide an advantage to the crosslinking of these polymers, in that MDNO allows for crosslinking with modest time and temperature conditions, including room temperature conditions. Table 1 of this patent shows that tensile strength values were only slightly better for the MDNO cured polymers than for prior art curing systems. No physical property data was provided for polyisoprene or natural rubber, as they are highly unsaturated polymers.

McGlothlin, et al. in U.S. Patent Application 2004/0071909 disclose high performance rubber vulcanizates from latex for producing thin walled rubber articles. Such vulcanizates contain a combination of carbon-carbon bonds, mono and polysulfidic crosslinks, without the use of components that contain secondary amine groups or any nitrosatable substances which have a tendency to convert to nitrosamines under certain conditions. The disclosed vulcanization method offers significant advantages over prior art, especially as compared to organic peroxide vulcanized rubber articles of manufacture. However, further improvements in physical properties are still desirable.

McGlothlin et al. in U.S. Pat. No. 6,329,444 disclose the use of sulfur-free, free-radical-cured cis-1,4-polyisoprene for use in dip-molded medical devices. Vulcanizates made by this method are free of undesirable accelerators and can have very low odor and be non-cytotoxic. However, physical properties of the vulcanizes are generally lower than for prior art accelerated sulfur vulcanizates.

McGlothlin, et al. in U.S. Pat. No. 6,775,848 disclose a method of secondary vulcanization by imbibing additional vulcanizing agent into an already partially vulcanized article. No disclosure is made to the possibility of incorporating a vulcanizing agent into a film for primary vulcanization.

Miller, et al. in U.S. Pat. No. 5,039,750 discloses the addition of small amounts of styrene butadiene latex added to traditional sulfur accelerated natural rubber latex in an attempt to improve tear strength and tensile strength properties. Modest improvements in both properties were noted. No improvement to odor would be expected, nor is there any note of the utility to latices which are free of sulfur and vulcanization accelerators.

Amnad in U.S. Pat. No. 5,872,173 discloses the use of silica added to synthetic latex to improve tear strength.

Amdur et al in U.S. Pat. No. 5,458,588 cites the use of dispersed silica in the prior art sulfur accelerated vulcanizing of natural rubber latex to improve the tensile strength, tear strength, wet strength, break force, puncture and tear resistance. While the silica addition appears to modestly improve both the tensile strength and the tear strength, it does so to the detriment of increasing the tensile modulus at low elongations, and to the detriment of ultimate elongation.

Evans, et. al, "Microencapsulated Antidegradants for Extending Rubber Lifetime" *Rubber Chemistry and Technology* Volume 65 No. 1, pp. 201-210 discloses the use of microencapsulation technology for extending the life of rubber compounding agents within compounded dry rubber. Evans also teaches state of the art technologies involved in microencapsulating chemical agents for use in rubber compounds. There is no disclosure in this publication of extending the life of vulcanization agents within compounded latex.

To the knowledge of the present inventors, there are no prior art publications which disclose the use of polynitrile oxides as suitable vulcanization agents for thin walled rubber film products made by dip-molding or casting and intended for direct or indirect contact with living tissue.

Indeed, polynitrile oxides are exceptionally reactive materials, especially with respect to compounds that contain multiple bonds, including the double bonds of rubber materials. This rapid rate of reaction can result in desirable crosslinking when the polynitrile oxides are used as vulcanizing agents; however it may also lead to extensive pre-vulcanization (i.e., rubber crosslinking that occurs prior to the dipping or casting stage). Although several prior art references address the use of polynitrile oxides as crosslinking agents for natural rubber and synthetic cis-1,4-polyisoprene rubber, none of these references teach a method to retard or prevent pre-vulcanization. As far as presently advised, no mention of pre-vulcanization of PNO crosslinked natural rubber or polyisoprene film products is made in the prior art; however, the methods employed suggest that it would be extensive.

As discussed in SU 2,042,664, cited above, the use of PNOs may be very desirable for crosslinking rubber materials that have very low levels of unsaturation. In that case, the high reactivity of the polynitrile oxide compensates for what would otherwise be a very slow vulcanization process (i.e., with traditional sulfur accelerated cure packages). However, when used to crosslink highly unsaturated materials such as natural rubber and synthetic polyisoprene, the high rate of reaction of PNOs makes them more reactive than even the fastest of the "ultra accelerators" used in sulfur cure systems. At first glance, it would appear that polynitrile oxides would be unacceptable crosslinking agents for thin walled rubber film products because complete pre-vulcanization crosslinking would interfere with the dip-molding or casting process.

Pre-vulcanization of solid rubber materials is a well-known problem. During compounding of dry rubber in rubber mills and the like, heat is generated, which can cause some vulcanization to begin. In some cases, this is desirable. In other cases, it is not. For instance, some vulcanization at this stage might improve the green strength of low molecular weight rubber materials. During the molding or extruding of rubber compounds, suitable accelerators are chosen to avoid too much unwanted early vulcanization of the material ("scorch") during processing. Rubber compounders select vulcanization accelerators, which do prevent the scorch from interfering with the curing process. With latex processes, it is permissible to use very rapid accelerators, such as dithiocarbamates, which would not be suitable for dry rubber. Because latex is processed at relatively low temperature, even the so-called "ultra accelerators" can be used, as even these are not too active in relatively cold latex compounds. For instance, it may take a matter of days before a latex compound is ruined due to too much unwanted pre-vulcanization at room temperature.

However, in the case of polynitrile oxide crosslinked rubber film products, if nothing is done to restrict pre-vulcanization, the resulting tensile strength properties of the product films can be about 50% of what they otherwise would have been. The reason for this is that traditional latex compounding practice for making such dip-molded or cast films is virtually always followed by a "maturation" or resting period. This maturation period is generally long enough for most of the bubbles to come out of the newly compounded latex but can also allow for extensive pre-vulcanization if methods are not employed for its prevention. Thus, in the normal course of screening polynitrile oxides as candidate crosslinking agents for rubber film products, the polynitrile oxides may well have been eliminated, in the past, from further consideration due to the poor physical properties resulting from the extensive pre-vulcanization during maturation.

Accordingly, it is among the objects of the present invention to provide thin walled dip-molded or cast rubber film products crosslinked by polynitrile oxide crosslinking agents, which have been prepared without substantial pre-vulcanization and which have improved tear strength, ultimate elongation and other properties.

A further object of this invention is to provide a method for forming such products.

Other objects and advantages of the products and methods of the invention will be apparent from the following description of preferred embodiments thereof.

BRIEF SUMMARY OF THE INVENTION

In accordance with the present invention, thin walled, dip-molded or cast rubber film products of a natural rubber or a synthetic polyisoprene rubber compound, crosslinked with a polynitrile oxide crosslinking agent are provided having superior physical properties, including improved tear and tensile strengths and ultimate elongation. Preferably, such products have tear strengths from about 15 kN/m to about 70 kN/m, tensile strength from about 1700 psi to about 6000 psi and ultimate elongation from about 550% to about 1200%.

The method of the present invention for preparing the film products hereof comprises:

(a) compounding a natural rubber or synthetic polyisoprene rubber latex so as to substantially reduce or prevent pre-vulcanization of the resulting rubber compound;

(b) dip-molding or casting the rubber compound to form a rubber film product;

(c) admixing the rubber compound or rubber film product with a polynitrile oxide crosslinking agent; and (d) curing the rubber compound to produce crosslinking thereof.

A preferred method of the present invention for preparing the film products hereof comprises:

(a) compounding a natural rubber or synthetic cis-1,4-polyisoprene rubber so as to substantially reduce or prevent pre-vulcanization of the resulting rubber compound;

(b) dip-molding or casting the rubber compound to form a wet or dry rubber gel;

(c) imbibing the polynitrile oxide into the wet or dry rubber gel; and (d) curing the rubber gel to produce crosslinking thereof.

Pre-vulcanization of the rubber compound is reduced or prevented in accordance with the present invention by one of a number of alternative techniques, for example, by reducing the temperature of the rubber latex or its ingredients prior to molding or casting, by microencapsulating the polynitrile oxide within a barrier material prior to compounding, or by delaying admixture of the polynitrile oxide with the rubber compound or film until immediately before curing, or by other techniques described more fully below.

The present invention thus addresses the need for the production of natural rubber and polyisoprene film products that have superior tear strength, tensile strength and other physical properties. Such products, preferably, meet the published physical property standards required by the applicable standards for particular rubber film products. While the use of polynitrile oxides for crosslinking such products has previously been known, we are not aware that they have previously been used effectively in producing dip-molded and cast film products. Nor has it been known that the use of polynitrile oxide crosslinkers can help to overcome many of the physical property deficiencies of currently manufactured medical and personal rubber film products. For example, utilizing the present invention, it is possible to very substantially increase the tear strength of even vulcanizates of accelerator free latex formulations.

Surprisingly, it has further been discovered that use of the present invention facilitates the production of vulcanizates of natural rubber and synthetic polyisoprene which exhibit minimal cell toxicity and excellent physical property profiles along with low odor and taste.

It has also been discovered in accordance with the present invention that the thin walled rubber film products of natural rubber or synthetic polyisoprene hereof exhibit the noted superior physical properties and yet contain no components that promote nitrosamine formation. Rubber products vulcanized with a polynitrile oxide crosslinking agent incorporate an isoxazoline crosslink in the rubber material so as to alleviate the need for secondary amino groups or any other traditional accelerators in the rubber compound. When used without such accelerators, the present invention can provide rubber products that are optimal for contact with living tissue due to the elimination of Type IV latex allergens.

Thin walled rubber film products in accordance with this invention are primarily contemplated for direct or indirect contact with living tissue, as well as for direct contact with liquids intended for infusion into human patients and for contact with gases intended for inhalation. Examples of these articles are medical gloves, condoms, diaphragms, catheter balloons, drug infusion bladders, tissue retrieval pouches, medical tubing, baby bottle nipples, infant pacifiers, anesthesia bags, resuscitation bags, and surgical tubing. Other examples will be apparent to those skilled in medical procedures and the various types of equipment used in these procedures.

BRIEF DESCRIPTION OF THE DRAWING

The attached figure is a graph illustrating the pot life of film products cured as described in Example 10 below.

DETAILED DESCRIPTION OF THE INVENTION

Definitions.

As used herein, the term "stable polynitrile oxide" refers to any polynitrile oxide species that does not readily dimerize or oligomerize to a polyfuroxan (1,2,5-oxadiazole-2-oxide). Preferably, stable polynitrile oxides are aromatic structures wherein each polynitrile oxide functionality is flanked with at least one and preferably two ortho groups of the aromatic structure. Ortho groups that provide for stable polynitrile oxides are any ortho groups that are larger than a hydrogen atom and do not themselves react with the polynitrile oxide functionality.

Further, the terms "curing" and "vulcanization" are used herein interchangeably, the term "vulcanization" being used in an analogy with the vulcanization of natural rubber. Vulcanization is intended to refer to the irreversible process during which a rubber compound becomes less plastic, more resistant to swelling by organic liquids and elastic properties are conferred, improved, or extended over a greater range of temperature through change in its chemical structure. In the present context, however, vulcanization is not intended to include crosslinking with sulfur or any use of sulfur or sulfur-containing compounds.

The term "pre-vulcanization" is used to refer to vulcanization (e.g., crosslinking with a polynitrile oxide crosslinking agent) of a rubber compound prior to making a rubber product. In the context of the present invention, pre-vulcanization is any crosslinking that occurs prior to film formation through dip-molding or casting techniques.

The term "compound" refers to the mixture of rubber and additives from which the rubber product is made.

The term "maturation" refers to a period of time after the formation of a latex compound in which the latex compound is stored prior to processing. Maturation is typically a period of time wherein the colloidal properties of the latex have changed.

The term "accelerator" refers to a compounding material used in small amounts with a vulcanizing agent to increase the speed of vulcanization and enhance the physical properties of the vulcanizate.

The term "nitrosatable" refers to any substance susceptible of reaction with atmospheric nitrogen oxides during mixing, milling, extrusion, molding, calendaring, curing, and even warehousing and storage, to produce nitrosamines.

The term "gel" refers to a colloidal rubber compound set into a jelly. Gels are formed through the process of gelation which converts the rubber compound to a gel of the same external shape as the vessel or mold in which it is placed.

The term "former" refers to an article having the same shape of the finished product, e.g., a mandrel. A former is immersed into the rubber compound during the dip-molding-process.

The term "crosslinking" is intended to refer to the process of bridging individual rubber molecules through the formation of covalent chemical bonds between the rubber molecules. In the context of crosslinking with a polynitrile oxide, rubber molecules are bridged together with a structure containing at least two isoxazoline units.

The term "low temperature curing" refers to a curing process in which all steps of the process are carried out at a temperature of about 150° F. or less.

The term "aryl" refers to an conjugated unsaturated carbocyclic group having 6-21 carbon atoms and having a single ring such as phenyl or multiple fused rings such as naphthyl or anthracyl. Suitable examples include, but are not limited to, phenyl, naphthyl, biphenyl, dibenzofuranyl, and dibenzothiophenyl. The aromatic structure may optionally be further fused to an aliphatic or another aromatic structure or can be substituted with one or more substituents such as halogen (fluorine, chlorine and/or bromine), hydroxy, thio, $C_1$-$C_7$ alkyl, $C_1$-$C_7$ alkoxy or aryloxy, $C_1$-$C_7$ alkylthio or arylthio, $C_1$-$C_7$ alkylsulfonyl or alkylsulfoxy, or any other group that is not reactive with a nitrile oxide functionality. In the context of the present invention, when the aromatic structure contains more than one aromatic ring (e.g., fused aromatic rings, aromatic rings directly bonded to one another, or aromatic rings connected through another functionality), the nitrile oxide functionalities may be bonded to one or more of the aromatic rings.

The term "bulky group", in the context of the present invention, refers to an organic functional group that is larger than a hydrogen atom and is not reactive with a nitrile oxide functionality. Suitable examples include, but are not limited to halogen (fluorine, chlorine and/or bromine), hydroxy, thio, $C_1$-$C_7$ alkyl, $C_1$-$C_7$ alkoxy or aryloxy, $C_1$-$C_7$ alkylthio or arylthio, $C_1$-$C_7$ alkylsulfonyl or alkylsulfoxy.

As indicated above, one aspect of the present invention comprises thin walled, dip-molded or cast rubber film products made from a natural rubber or a synthetic polyisoprene rubber compound and crosslinked with a polynitrile oxide crosslinking agent.

In such products, the polynitrile oxide fully reacts with the polymers and becomes part of the crosslinked thin walled film product. As noted above, film products that are cured with polynitrile oxide crosslinking agents contain rubber molecules that are bridged together with a structure containing at least two isoxazoline units.

The thin walled, dip-molded or cast rubber film products hereof incorporate the structure shown in formula (I);

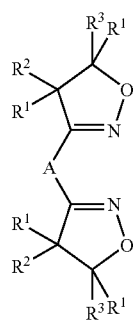

(I)

wherein

A represents an aryl group substituted by a bulky group in at least one ortho position to the isoxazoline rings, wherein the aromatic structure has a ratio of hydrogen atoms to carbon atoms of less than 1:1 and wherein the bulky group is substantially unreactive with a nitrile oxide functionality.

$R^1$ represents the natural rubber or cis-1,4-polyisoprene rubber polymer chain associated with the material;

$R^2$ and $R^3$ are independently selected from hydrogen and methyl wherein;

When $R^2$ is methyl, $R^3$ is hydrogen and,

When $R^3$ is methyl, $R^2$ is hydrogen.

In a preferred embodiment of the present invention, the thin walled, dip-molded or cast rubber film products are crosslinked with stable polynitrile oxides such as MDNO or TON-2 and incorporate the structure shown in formula (II)

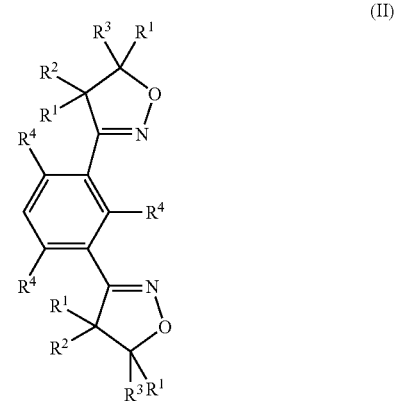

(II)

wherein, $R^1$ represents the natural rubber or cis-1,4-polyisoprene rubber polymer chain associated with the material;

$R^2$ and $R^3$ are independently selected from hydrogen and methyl wherein;

When $R^2$ is methyl, $R^3$ is hydrogen and,

When $R^3$ is methyl, $R^2$ is hydrogen.

$R^4$ is methyl or ethyl.

Even if the polynitrile oxide were not to fully react during the manufacturing process, i.e., upon curing, it would likely fully react at room temperature shortly thereafter. This is very significant from the perspective of medical and personal film products, which directly or indirectly contact human tissue. Most vulcanization systems, with the possible exception of high-energy radiation crosslinking, involve the release of reaction byproducts. This is especially true of sulfur accelerated vulcanization systems wherein the traditional nitrogen-containing accelerators can lead to nitrosamine formation and ultimately to Type IV allergic reactions when the rubber products come into contact with living tissue. It is also true of organic peroxide cure systems. Although the byproducts of peroxide vulcanization are generally not toxic, they may be objectionable with respect to odor and taste created by the breakdown products of the organic peroxide(s). For instance, in the case of dicumyl peroxide, odorous acetophenone is released as a breakdown product. While high energy radiation free radical vulcanization may not release residuals, typically some type of radiation sensitizer is used, which produces an undesirable odor.

As a result of polynitrile oxide crosslinking, no residual chemicals would remain in the fully cured rubber compound. The production of rubber film products using this method therefore, possess no nitrosatable substances and Type IV allergens and a very low odor and taste.

The thin walled film products of the present invention have:

a tear strength from about 15 kN/m to about 70 kN/m; preferably from about 25 kN/m to about 60 kN/m; and more preferably from about 40 kN/m to about 60 kN/m;

an ultimate tensile strength from about 1700 psi to about 6000 psi; preferably from about 2450 psi to about 5500 psi; more preferably from about 3300 psi to about 4500 psi;

a 100% tensile modulus from about 70 psi to about 130 psi; preferably from about 80 psi to about 120 psi; more preferably from about 90 psi to about 110 psi;

a 300% tensile modulus from about 140 psi to about 280 psi; preferably from about 160 psi to about 260 psi; more preferably from about 180 psi to about 220 psi;

a 500% tensile modulus from about 200 psi to about 1200 psi; preferably from about 300 psi to about 800 psi; more preferably from about 350 psi to about 500 psi; and an ultimate percent elongation from about 550% to about 1200%; preferably from about 700% to about 1100%; more preferably from about 800% to about 1050%.

Natural rubber utilized in the products hereof can be obtained from several sources, including *Hevea btasiliensis, Parthenum argentatum* (commonly known as "guayule"), and *Ficus elastica* rubber trees. Methods for obtaining natural rubber latices from non-Hevea sources, such as the Lactrius Volemus mushroom and the Russian dandelion are described in U.S. Pat. No. 5,580,942, issued Dec. 3, 1996, to Cornish. Natural rubber latex is available in several grades, including high ammonia latex, low ammonia latex, and others. All such varieties are suitable for use in the products and methods of the present invention. The invention also extends to natural rubber latices that have been processed to reduce the amount of proteins present in the latices. Some of these processes include centrifuging to separate and remove water, and others include double centrifuging, in which an initial centrifuging is followed by the addition of water and a second centrifuging. Still other processes involve the use of enzymes to digest the proteins. Descriptions of applicable enzyme methods are found in U.S. Pat. No. 5,610,212 Mar. 11, 1997, U.S. Pat. No. 5,569,740, Oct. 29, 1996, and U.S. Pat. No. 5,585,459, Dec. 17, 1996, all to Tanaka et al. An example of a commercially available deproteinized rubber latex which may be utilized in the present invention is ALLOTEX®, obtainable from Tillotson Healthcare Corporation, Rochester, N.H., USA.

Synthetic cis-1,4-polyisoprene useful herein is commercially available in the United States from The Goodyear Tire & Rubber Company, Beaumont, Tex., USA., in Western Europe from Kraton Polymers Division of Ripplewood Holdings LLC, Bemis, Netherlands, and in Japan from Japan Synthetic Rubber Co., Ltd., and from Nippon Co., Ltd. Such polymer is produced by polymerizing isoprene over a Ziegler catalyst consisting of isobutylaluminum and titanium tetrachloride, or alkali metal catalysts such as finely divided lithium metal or organolithium compounds. Other catalysts known in the polyisoprene art can be used as well. The polymer is also capable of preparation by processes involving anionic polymerization, cationic polymerization, and free-radical polymerization. These processes, and the conditions under which they are performed are known in the art. For typical synthetic cis-1,4-polyisoprene prior to crosslinking, the weight-average molecular weight generally ranges from about 750,000 amu to about 950,000 amu, and the number-average molecular weight generally ranges from about 250,000 amu to about 350,000 amu. Synthetic cis-1,4 polyisoprene prepared by the Ziegler catalyst route has about 96 to about 98% of its monomeric units joined in cis-1,4 orientation. In those made via anionic polymerization, about 90% to about 92% of the monomeric units are joined in cis-1,4 orientation. Preferred synthetic cis-1,4-polyisoprenes for use in this invention are those produced either by the aforesaid Ziegler catalysis or anionic polymerization methods.

In a preferred embodiment of the present invention, the natural rubber or cis-1,4-polyisoprene rubber is in the form of a latex. Latices of natural rubber or cis-1,4-polyisoprene are formed by methods known to those skilled in the art of rubber compounding and processing. These methods include either emulsification of an organic solution of the polymer in an aqueous medium followed by removing the solvent, or liquefaction of the polymer and combining the liquefied polymer with the aqueous medium under emulsification conditions. The emulsion can be stabilized by various emulsifying agents. Typical emulsifying agents which may be so utilized are potassium and sodium salts of rosin acids and higher fatty acids, such as potassium and sodium salts of oleic acid, palmitic acid, stearic acid, lauric acid, myristic acid, arachidic acid, and ricinic acid, as well as sulfates and sulfonates of these acids, such as sodium lauryl sulfate and sodium lauryl sulfonate. Other suitable emulsifying agents are amine salts of hydroxylamines of long-chain fatty acid esters, quaternary ammonium salts such as stearyldimethylbenzylammonium chloride and tridecylbenzenehydroxyethylimidazole chloride, phosphoric esters of higher alcohols such as capryl and octyl alcohol, and monoesters of oleic acid and pentaerythritol such as sorbitan monooleates. The relative amounts of each phase may vary, although in most cases, the volume ratio (organic:aqueous) will range from about 0.5:1 to about 20:1, and preferably from about 0.75:1 to about 1.25:1, for best results. When an organic solvent is used, suitable solvents are aliphatic hydrocarbons, preferably those containing 5 to 8 carbon atoms, e.g., pentane, pentene, hexane, heptane, cyclohexane, cyclopentane, and tetrahydrofuran. The solvent is readily removed by evaporation or other conventional means to leave the solvent-free aqueous latex. If desired, the latex can then be concentrated by conventional methods, one example of which is ultrafiltration as disclosed by DelPico, U.S. Pat. No. 4,160,726 (Jul. 10, 1979) and by Tanaka et al., U.S. Pat. No. 5,569,740 (Oct. 29, 1996).

Polynitrile oxide crosslinking agents suitable in the practice of the present invention are any polynitrile oxides that bond the individual rubber molecules of the thin walled film products with at least two isoxazoline moieties within each crosslink unit. PNO crosslinking agents may be any of the PNO crosslinking agents known in the prior art, for example those appearing in U.S. Pat. No. 3,390,204, U.S. Pat. No. 6,252,009, and U.S. Pat. No. 6,355,826. The PNOs used in the practice of the present invention may be added neat, or in an aqueous or organic dispersion, and may be present as mixtures of more than one PNO. It is preferred that the polynitrile oxides used in the practice of the present invention are stable polynitrile oxides. Examples of specific stable PNOs for the practice of the present invention include the following compounds:

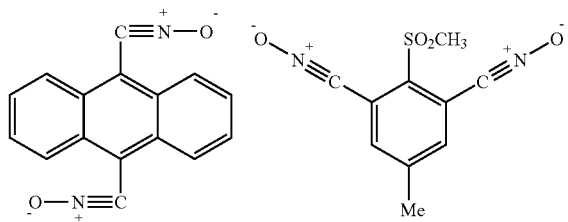

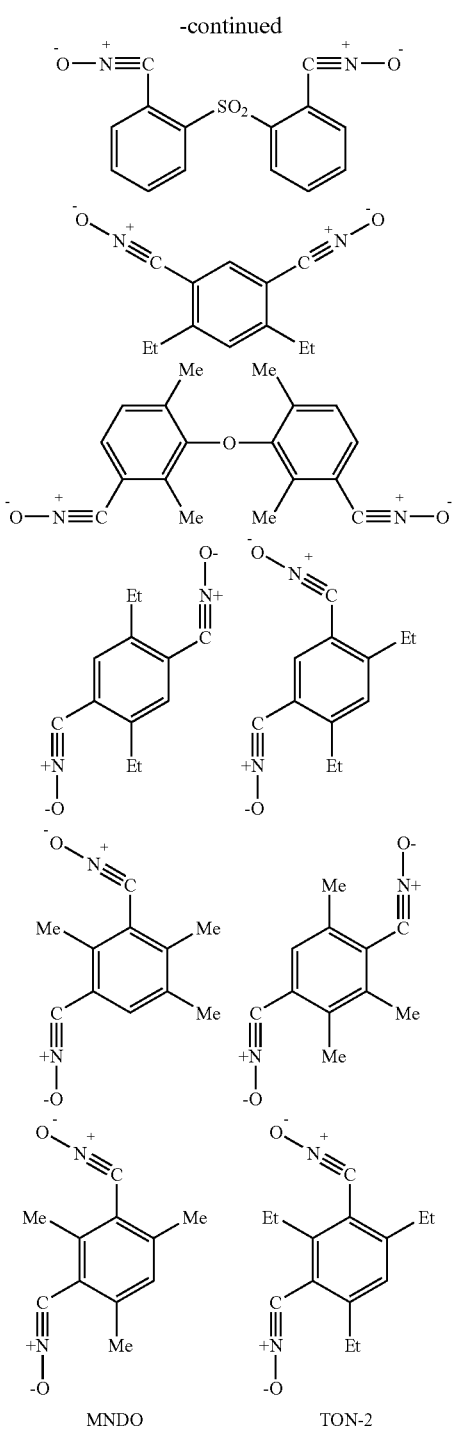

Preferably, the PNO is mesitylene dinitrile oxide (MDNO) or 2,4,6-triethylbenzene dinitrile oxide (TON-2)

The organic solvent which is used either in forming the latex or as the solvent when an organic solution rather than a latex is used as a dipping medium, can be any solvent that is inert to the polyisoprene and is readily removable by evaporation from the dip-molded film. The solvent is preferably an aliphatic hydrocarbon, saturated or unsaturated, linear, branched, or cyclic; or ethers, esters, alcohols, or amines. Typical solvents are aliphatic hydrocarbons containing 5 to 8 carbon atoms, such as pentane, pentene, hexane, heptane, cyclohexane and cyclopentane, and tetrahydrofuran.

Antioxidants, antiozonants, and other additives may be utilized in the film products of the invention. Antioxidants and antiozonants may be included to protect against environmental aging. Preferred antioxidants are hindered phenolic compounds, e.g., 4-{[4,6-bis(octylthio)-s-triazin-2-yl]amino}-2,6-di-t-butyl-phenol, 2,4-bis[(octylthio)methyl]-o-cresol, and polymerized 1,2-dihydro-2,2,4-trimethylquinoline.

Small amounts of other rubber materials can also be included as additives or blending agents. The use of carboxylated styrene butadiene rubber with at least 50% styrene content is preferred as a reactive reinforcing agent. Other reinforcing agents may also be included in some embodiments of the invention. Examples of suitable reinforcing agents are silica (notably fumed silica), carbon black, and chopped fibers. The use of fibers to improve the tear strength of medical gloves is disclosed in U.S. Pat. No. 6,021,524, issued Feb. 8, 2000, to Wu et al., and the use of fumed silica to improve the tear strength of dipped films is disclosed in U.S. Pat. No. 5,872,173, issued Feb. 16, 1999, to Anand. Pigments and dyes may also be included, as may any of the other additives known to those skilled in the art of rubber formulations and the manufacture of rubber products.

The rubber compounds used in the present invention may further include a sufficient amount of a surfactant, depending on the end product application, to act as a mechanical and chemical stabilizer in the synthetic latex system. The particular type of surfactant used will vary depending on the colloidal system of the latex itself. For example, anionic surfactants such as salts of alcohol sulfates are known to be useful as mechanical stabilizers and wetting agents in many anionic latexes. Cationic latices, on the hand, typically require cationic or non-ionic surfactants such as quaternary ammonium salts. In one embodiment of the present invention, the rubber may be compounded with a sufficient amount of an anionic surfactant, such as DARVAN® WAQ (sodium alkyl sulfate) or DARVAN® SMO surfactant (DARVAN is a registered trademark of Vanderbilt Company, R. T., Inc.). Preferably, the surfactant is in an amount ranging between about 0.2 phr to about 2.0 phr.

Additionally, the rubber compound used in the present invention may be treated with a coagulant prior to curing. Coagulants are used to help the latex adhere to the former in the dip-molding operation by forcing the latex particles to form a hydrated film (i.e., wet gel) on the surface of the former. Typically, a coagulant is dissolved in water and set up in a separate dipping bath. The former is first immersed into the liquid coagulant bath to coat the former with coagulant solution. Some or all of the carrier water is then evaporated from the former, leaving a very thin layer of coagulant on the surface of the former. The coagulant coated former is then immersed into the compounded latex bath where the coagulant destabilizes the latex particles to form a wet gel. Conventional coagulants used in the rubber industry can be used, including salts, polyvalent cations such as calcium nitrate, mixtures of calcium nitrate and calcium chloride, acids (including volatile acids such as acetic and formic acid), and dehydrating solvents. A preferred coagulant is calcium nitrate. In one embodiment of the present invention, the coagulant solution contains an additional surfactant, preferably Igepal CO-630, to allow for proper wetting of the coagulant solution onto the surface of the former.

The various components of the latex can be combined in any manner that will produce a fluid medium with uniformly dispersed solids or droplets. Preferably, the individual components are first placed in fluid form, either as solutions or aqueous-based emulsions or dispersions. In the preferred compounding technique, the individual fluids are then combined by simple mixing to form the latex.

If one wishes to concentrate the latex by reducing the amount of water in the latex before dip-molding, water can be removed from the latex by conventional methods. A preferred method is ultrafiltration. Ultrafiltration membranes and their use in concentrating latices are disclosed by DelPico, U.S. Pat. No. 4,160,726 (Jul. 10, 1979) and Tanaka et al., U.S. Pat. No. 5,569,740 (Oct. 29, 1996).

Although the final film thickness is not critical in this invention, preferred films are those whose thickness is about 0.02 inch (0.051 cm) or less, most preferably from about 0.001 inch (0.0025 cm) to about 0.02 inch (0.051 cm). For surgical gloves, a particularly preferred thickness range is from about 0.003 inch to about 0.015 inch (about 0.0076 cm to about 0.038 cm). For condoms, a particularly preferred thickness range is from about 0.002 inch to about 0.005 inch (about 0.005 cm to about 0.013 cm). Other products, such as catheter balloons, may have different ranges that are particularly preferred, but all will be within the broader ranges cited above, and all will be readily apparent to those skilled in the manufacture of such products.

In accordance with the method aspect of the present invention, the very high level of reactivity of the polynitrile oxides should be taken into account to prevent premature reaction of the polynitrile oxide with the rubber compound, i.e., prior to the formation of a wet or dry gel of the rubber article. This will prevent the rubber compound from excessive pre-vulcanizing (pre-curing). The inhibition of pre-vulcanization can be done in a number of different ways.

In a first embodiment, the temperature of the compounding ingredients may be significantly reduced prior to mixing (e.g., from a temperature from about 32° F. to 75° F.), and the compounded latex may then be stored at a reduced temperature (e.g., from a temperature from about 32° F. to 60° F.) prior to use. This technique is useful, but it only slows down the pre-vulcanization process to an extent. For rubber compounds that can be used within 60 minutes or less, preferably 30 minutes or less, and most preferably 15 minutes or less from the time the polynitrile oxide is added to the rubber compound, this can be a very useful technique. For instance, this technique is useful in the casting of rubber sheeting for use in rubber dental dams can be produced effectively in this manner.

In an alternative preferred embodiment, the polynitrile oxide or polynitrile oxide dispersion may be microencapsulated within a barrier material coating prior to compounding it into the rubber mixture. The polynitrile oxide is thus prevented from reacting with significant numbers of rubber particles until the outer shell of the microcapsules are breached, thus allowing the polynitrile oxide to begin the crosslinking reaction. By way of example only, the heating of the wet or dry gel of the rubber compound (e.g., from a temperature from about 80° F. to 212° F.) can breach the outer shell of a suitable microencapsulated particle, thus allowing the vulcanization reaction to begin. This microencapsulation technique is very well suited when a large volume of compounded rubber is to be prepared in advance of its use to produce dip-molded or cast articles. This is especially useful in dip-molding processes, where dip tanks hold much compounded rubber, and the residence time of the rubber is long, due to the relatively small amount of compound removed by each dipping former.

In still another alternative embodiment, the rubber is compounded with all ingredients, except for the polynitrile oxide dispersion. Immediately prior to use, the polynitrile oxide can then be added. In a continuous system, the polynitrile oxide can be mixed in with a metering pump, for instance. Alternatively, the polynitrile oxide can be mixed directly into a small batch of otherwise fully compounded rubber, immediately prior to use. In the case of cast films for rubber sheeting for producing dental dams and the like, this works exceptionally well. Once mixed, the polynitrile oxide is free to react, but the full volume of compounded rubber is almost immediately used up in the manufacturing process.

Additionally, pre-vulcanization may be substantially reduced or eliminated by forming a wet or dry gel of the rubber compound, which does not contain a polynitrile oxide, and then imbibing the polynitrile oxide into the film. Once imbibed, the vulcanization reaction immediately begins, and forms a fully post-vulcanized vulcanizate with excellent properties. A suitable solvent needs to be chosen, such as toluene, or an alkyl acetate, which can dissolve the polynitrile oxide and preferably only swells the rubber gel. Such technique works very well for relatively small items, such as catheter balloons.

In yet another embodiment to substantially reduce or eliminate pre-vulcanization, the polynitrile oxides are placed in a coagulation bath. Polynitrile oxide is thus kept away from the rubber compound, until the rubber is actually being processed. This method works best with thin films, especially those films with wall thicknesses of 0.005" or less.

In a further embodiment, a dip-molding or casting operation may be performed which lays down alternating layers of rubber compound and polynitrile oxide dispersion or polynitrile oxide dissolved in solvent. This technique overcomes the film thickness limitations of the prior method, but does add some complexity.

Additionally, pre-vulcanization may be substantially reduced or eliminated by the constant addition of new, freshly made compounded rubber to a dip tank of relatively small internal volume, and then processing a very large number of formers very quickly. In this manner, the resonance time for the compounded rubber is very short, allowing for only a small amount of pre-vulcanization.

In yet another alternative embodiment, pre-vulcanization may be substantially reduced or eliminated by substantial reduction or elimination of a maturation period for the compounded rubber. By way of example only, the maturation period of the rubber compound prior to film formation is from about 0 hours to about 48 hours, preferably, from about 0 hours to about 24 hours.

As indicated above, the present invention involves the formation of thin films with dip-molding or casting techniques; however, formation of a latex into a thin film can be accomplished by any conventional method, including spraying, rolling, the use of a doctor blade, or various molding techniques well known in the art. For many medical and personal devices, particularly those that are hollow, such as condoms, surgical and examination gloves, and finger cots, dip-molding is an especially effective and convenient means of forming the film. The film may or may not be self supporting, depending on the application. Dip-molding is achieved by dipping a mandrel, or in general terms, a form whose outer surface has the configuration of the product to be formed, in a liquid medium that contains the liquefied polymer, then withdrawing the form from the liquid to leave a continuous film of the liquid over the surface of the form.

The liquid medium may be either a latex (an aqueous emulsion of the polymer in which the polymer is the dispersed phase and water or an aqueous solution is the continuous phase) or a solution of the polymer in an organic solvent. The film is then dried in place on the form (i.e., the solvent or carrier liquid is evaporated) and the polymer is cured (vulcanized) either before or after the drying step. The dried and cured film, which is now the product in its final shape and composition, is then stripped from the form.

The technique used for curing in the present invention can be any technique for obtaining complete crosslinking of the polynitrile oxide crosslinking agent with the rubber compound. Curing can take place in a convection oven, forced convection oven, steam chamber, or molten media bath. Additionally, infrared heating or microwave heating techniques may be used, or the film product can remain at room temperature until curing is completed. Thin walled dip-molded or cast rubber film products can be cured at temperatures ranging from about 0° F. to about 350° F. In a preferred embodiment of the present invention, film products are cured at a temperature from about 60° F. to about 212° F.

It is often useful to determine the extent to which a dipped film or article has been vulcanized. A commonly-used method is to cut out a circular disk of the cured film and measure the change in diameter upon immersion of the disk in a solvent bath. A detailed explanation of this test and its use with polyisoprene latex is found in U.S. Pat. No. 3,215,649, issued Nov. 2, 1965, to Preiss et al., entitled "Synthetic Latex." Similar test methods are available for other types of vulcanized polymers, and are well known to those skilled in the art.

The following examples are given for purposes of illustration and are not intended to limit the scope of the invention. All test films in the examples were prepared by the following technique unless otherwise indicated.

Test Films

Materials:

(1) Latices

Synthetic cis-1,4-polyisoprene latex containing approximately 60% solids, Product No. IR-RP401, supplied by Kraton Polymers.

Natural Rubber Latex (NRL) Centex HF containing 61.3% solids, supplied by Centro Trade Rubber USA, Inc., Virginia Beach, Va.

(2) Crosslinking Agents

Mesitylene Dinitrile Oxide (MDNO) Dispersion, prepared by Apex Medical Technologies, Inc. The following procedure was used to prepare an aqueous dispersion of 30% active MDNO for easy addition of MDNO into a latex system. A 60 ml polypropylene bottle is filled about half full with ¼" diameter steel spheres. These spheres will serve as the grinding media for dispersing the MDNO. Solid MDNO, Darvan #1 dispersing agent, Van Gel B viscosity stabilizer, Igepal CO-630 surfactant and water are then added to the bottle. The bottle was closed and then rolled on a laboratory roll mill for up to 3 hours until the MDNO was fully dispersed.

Dicumyl Peroxide Dispersion: A master batch of 37% solids dicumyl peroxide dispersion was prepared by mixing the following materials for two minutes under high shear: 100 g of dicumyl peroxide, 66.5 g of toluene, 5.6 g of oleic acid, 101 g of deionized water, and 2.6 g of 30 weight percent aqueous potassium hydroxide solution. This resulted in a dispersion in which the dicumyl peroxide was uniformly dispersed.

Sulfur Dispersion: The sulfur was a 68% active sulfur dispersion commercially available as Bostex 410, supplied by Akron Dispersions, Akron, Ohio, USA. A zinc oxide dispersion was also used, consisting of 62% active zinc oxide commercially available as Octocure 462, supplied by Tiarco Division of Textile Rubber and Chemical Co., Inc., Dalton, Ga., USA.

(3) Surfactant

Darvan WAQ (Sodium Alkyl Sulfate), 30% TSC, supplied by R. T. Vanderbilt Company, Inc., Norwalk, Conn.

(4) Reinforcing Agent

Styrene Butadiene Rubber Latex (SBR), prepared by Apex Medical Technologies, Inc., San Diego, Calif. The styrene-butadiene rubber latex used for compounding is a mixture of Rovene 4106 and Rovene 4457. The two styrene-butadiene rubber latexes are added to a plastic jug and rolled on a laboratory roll mill for a few minutes creating a blend that has a total styrene content of 77% and a total percent solid content of 52.4%. Rovine is the trademark of Mallard Creek Polymers, Charlotte, N.C. 28262.

Cab-O-Sperse GP-50 water-dispersed fumed silica. The silica was a 20% (by weight) aqueous dispersion, supplied by Cabot Corporation (5) Antioxidant The antioxidant consisted of a dispersion of Irganox 565 (4-[[4,6-Bis(octylthio)-s-trianzin-2-yl]amino]-2,6-di-butylphenol), supplied by Ciba Chemicals.

(6) Coagulant Solution

The coagulant solution consisted of a mixture of 3,975 grams of deionized water, 1,000 calcium nitrate and 25 g of Igepal CO-630 surfactant. All ingredients were mixed together until dissolved, and then the solution was allowed to age 3 days prior to use. Igepal CO-630 (Nonyl Phenol 9 Mole Ethoxylate) was supplied by Stepan Company, Northfield, Ill. USA.

Preparation of Test Films:

Ingredients for each of the following formulations were weighed into a 500 mL polyethylene bottle and mixed under medium shear (30 RPM) for 15 minutes at room temperature using a laboratory XP mixer, then rolled for 15 minutes on a laboratory roll mill. The formulation was filtered into a polyethylene graduated cylinder and degassed for a period of 10 minutes at a vacuum level of 15 inches Hg.

The respective test films were dip-molded on 32 mm glass mandrels without a maturation period for the compounded latex. The mandrels were pre-heated in a 150° F. oven, then dipped into the coagulant solution at a speed of 0.8 inches per second and lifted out at a speed of 0.2 inches per second. The mandrels were allowed to dwell in the coagulant for 15 seconds. The coagulant coated mandrels were dried for 5 minutes in a 150° F. oven. The mandrels were thereafter dipped into the latex at a speed of 0.8 inches per second and lifted out at an exit speed of 0.2 inches per second. The mandrels were allowed to dwell in the latex for 15 seconds.

Once dipped, the films were dried for 5 minutes in a 150° F. oven. The films were leached in a 60° C. water bath for 3 minutes. The resulting films were then dried in a 150° F. oven for 60 minutes. The peroxide cured films were additionally cured for 9 minutes in a 350° F. salt bath.

The films were rinsed, stripped with powder and readied for tear testing per ASTM D624, and for tensile testing per ASTM D3492.

The test films prepared in the following examples and comparative preparations were formed by dip-molding as described above.

Comparison of Synthetic Polyisoprene Films Crosslinked with MDNO (Examples 1-4) with Synthetic Polyisoprene films Crosslinked with Dicumyl Peroxide (Comparative Preparations A-D)

EXAMPLE 1

Comparitive Preparation A

Comparison of Polyisoprene Latices Plus an SBR Reinforcing Agent Cured with MDNO (Example 1) and Dicumyl Peroxide (Comp. Prep. A) Crosslinking Agents

TABLE 1

MDNO and Peroxide-Cured Polyisoprene Films with SBR Reinforcing Agent

|  | Example 1 | | Comp. Prep. A | |
| --- | --- | --- | --- | --- |
| Ingredient | % TSC[a] | Parts by Weight (Dry) | % TSC | Parts by Weight (Dry) |
| Synthetic Polyisoprene Latex (SPIL) IR-307 | 60 | 100 | 60 | 100 |
| Styrene Butadiene Rubber Latex (SBR) | 52.4 | 5 | 52.4 | 5 |
| MDNO Dispersion | 30 | 1.2 | — | — |
| Dicumyl Peroxide Emulsion | — | — | 37 | 1.2 |
| Darvan WAQ surfactant | 30 | 0.5 | 30 | 0.5 |
| Cab-O-Sperse GP-50 Aqueous Silica Dispersion | 20 | 2 | 20 | 2 |
| Antioxidant Dispersion | 50 | 2 | 50 | 2 |
| Deionized Water - as necessary to dilute compound to 45% TSC | | | | |

[a] % TSC is Total Solids Content of Each Respective Ingredient

Determination of Tensile Properties

The dip-molded thin films prepared from the formulations of Example 1 and Comp. Prep. A were subjected to mechanical tests to determine their tensile properties. Values for 50%, 100%, 300%, and 500% tensile modulus were measured as well as values for ultimate tensile strength, ultimate elongation and tear strength. The physical property testing was performed in accordance with the ASTM D-3492 standard for condom rings.

TABLE 2

Comparison of Tensile Properties of MDNO and Peroxide Cured SBR Reinforced Polyisoprene Films

| Property | Example 1 | Comp. Prep. A |
| --- | --- | --- |
| Tensile Modulus | | |
| 50% | 66 | 58 |
| 100% | 91 | 92 |
| 300% | 164 | 199 |
| 500% | 257 | 396 |
| Ultimate Tensile Strength (psi) | 4911 | 3402 |
| Increase in Tensile Strength (Ex. 1 vs Comp. Prep. A) | 44.36% | — |
| Ultimate Percent Elongation (%) | 1124 | 801 |
| Tear Strength (kN/m) | 36.2 | 12.7 |
| Increase in Tear Strength (Ex. 1 vs Comp. Prep. A) | 185% | — |

As will be apparent from the preceding tabulation, Example 1 (utilizing MDNO as the crosslinking agent with a conventional SBR reinforcing agent but free of accelerator) exhibits superior tensile and tear properties as compared with Comp. Prep. A. (utilizing a peroxide crosslinking agent, but otherwise identical). Moreover, notwithstanding the increase of tensile and tear properties, the tensile modulus values remained low.

EXAMPLE 2

Comparative Preparation B

Comparison of Polyisoprene Latices Cured with MDNO (Example 2) and Dicumyl Peroxide (Comp. Prep. B) Crosslinking Agents

TABLE 3

MDNO and Peroxide-Cured Polyisoprene Films (with SBR omitted)

|  | Example 2 | | Comp. Prep. B | |
| --- | --- | --- | --- | --- |
| Ingredient | % TSC | Parts by Weight (Dry) | % TSC | Parts by Weight (Dry) |
| Synthetic Polyisoprene Latex (SPIL) IR-307 | 60 | 100 | 60 | 100 |
| MDNO Dispersion | 30 | 1.2 | — | — |
| Dicumyl Peroxide Emulsion | — | — | 37 | 1.2 |
| Darvan WAQ surfactant | 30 | 0.5 | 30 | 0.5 |
| Cab-O-Sperse GP-50 Aqueous Silica Dispersion | 20 | 2 | 20 | 2 |
| Antioxidant Dispersion | 50 | 2 | 50 | 2 |
| Deionized Water - as necessary to dilute compound to 45% TSC | | | | |

TABLE 4

Comparison of Tensile Properties of MDNO and Peroxide Cured Polyisoprene Films

| Property | Example 3 | Comp. Prep. B |
| --- | --- | --- |
| Tensile Modulus | | |
| 50% | 56 | 48 |
| 100% | 84 | 77 |
| 300% | 152 | 165 |
| 500% | 238 | 335 |
| Ultimate Tensile Strength (psi) | 4912 | 3337 |
| Increase in Tensile Strength (Ex. 2 vs Comp. Prep. B) | 47.2% | — |
| Ultimate Percent Elongation (%) | 1105 | 791 |
| Tear Strength (kN/m) | 33.2 | 11.2 |
| Increase in Tear Strength (Ex. 2 vs Comp. Prep. B) | 196% | — |

As will be apparent from the preceding tabulation, Example 2 (utilizing MDNO as the crosslinking agent) exhibits superior tensile and tear properties as compared with Comp. Prep. B. (utilizing a peroxide crosslinking agent, but otherwise identical), even with the SBR reinforcing agent omitted. These experiments show the limited contribution that the SBR makes to increased tear strength, while the MDNO crosslinker significantly increases the tensile strength and tear strength.

EXAMPLE 3

Comparative Preparative C

Comparison of Polyisoprene Latices Plus an SBR Reinforcing Agent, Cured with MDNO/Sulfur (Example 3) and Dicumyl Peroxide/Sulfur (Comp. Prep. C) Crosslinking Agents

TABLE 5

MDNO and Peroxide-Cured Polyisoprene Films (with sulfur)

| | Example 2 | | Comp. Prep. B | |
|---|---|---|---|---|
| Ingredient | % TSC | Parts by Weight (Dry) | % TSC | Parts by Weight (Dry) |
| Synthetic Polyisoprene Latex (SPIL) IR-307 | 60 | 100 | 60 | 100 |
| Styrene Butadiene Rubber Latex (SBR) | 52.4 | 5 | 52.4 | 5 |
| Sulfur Dispersion | 68 | 0.4 | 68 | 0.4 |
| MDNO Dispersion | 30 | 1.2 | — | — |
| Dicumyl Peroxide Emulsion | — | — | 37 | 1.2 |
| Darvan WAQ surfactant | 30 | 0.5 | 30 | 0.5 |
| Cab-O-Sperse GP-50 Aqueous Silica Dispersion | 20 | 2 | 20 | 2 |
| Antioxidant Dispersion | 50 | 2 | 50 | 2 |
| Deionized Water - as necessary to dilute compound to 45% TSC | | | | |

TABLE 6

Comparison of Tensile Properties of MDNO and Peroxide Cured Polyisoprene Films (with sulfur)

| Property | Example 3 | Comp. Prep. C |
|---|---|---|
| Tensile Modulus | | |
| 50% | 65 | 55 |
| 100% | 96 | 80 |
| 300% | 176 | 150 |
| 500% | 291 | 245 |
| Ultimate Tensile Strength (phi) | 4666 | 4361 |
| Increase in Tensile Strength (Ex. 3 vs Comp. Prep. C) | 7.0% | — |
| Ultimate Percent Elongation (%) | 1081 | 1084 |
| Tear Strength (kN/m) | 39.6 | 18.1 |
| Increase in Tear Strength (Ex. 3 vs Comp. Prep. C) | 118.8% | — |

As will be apparent from the preceding tabulation, Example 3 (utilizing MDNO and sulfur as the crosslinking agents with a conventional SBR reinforcing agent but free of accelerator) exhibits modestly higher tensile and substantially higher tear strength as compared with Comp. Prep. C. (utilizing peroxide and sulfur as crosslinking agents, but otherwise identical). Moreover, notwithstanding the increase of tensile and tear properties, the tensile modulus values remained low.

EXAMPLE 4

Comparative Preparative D

Comparison of Polyisoprene Latices Cured with MDNO/Sulfur (Example 4) and Dicumyl Peroxide/Sulfur (Comp. Prep. D) Crosslinking Agents

TABLE 7

MDNO/Sulfur and Peroxide/Sulfur Cured Polyisoprene Films

| | Example 4 | | Comp. Prep. D | |
|---|---|---|---|---|
| Ingredient | % TSC | Parts by Weight (Dry) | % TSC | Parts by Weight (Dry) |
| Synthetic Polyisoprene Latex (SPIL) IR-307 | 60 | 100 | 60 | 100 |
| Sulfur Dispersion | 68 | 0.4 | 68 | 0.4 |
| MDNO Dispersion | 30 | 1.2 | — | — |
| Dicumyl Peroxide Emulsion | — | — | 37 | 1.2 |
| Darvan WAQ surfactant | 30 | 0.5 | 30 | 0.5 |
| Cab-O-Sperse GP-50 Aqueous Silica Dispersion | 20 | 2 | 20 | 2 |
| Antioxidant Dispersion | 50 | 2 | 50 | 2 |
| Deionized Water - as necessary to dilute compound to 45% TSC | | | | |

TABLE 8

Comparison of Tensile Properties of MDNO/Sulfur and Peroxide/Sulfur Cured Polyisoprene Films (SBR Absent)

| Property | Example 4 | Comp. Prep. D |
|---|---|---|
| Tensile Modulus | | |
| 50% | 57 | 47 |
| 100% | 84 | 71 |
| 300% | 152 | 132 |
| 500% | 246 | 211 |
| Ultimate Tensile Strength (psi) | 4719 | 4282 |
| Increase in Tensile Strength (Ex. 4 vs Comp. Prep. D) | 10.2% | — |
| Ultimate Percent Elongation (%) | 1066 | 1094 |
| Tear Strength (kN/m) | 26.2 | 17.5 |
| Increase in Tear Strength (Ex. 4 vs Comp. Prep. D) | 49.7% | — |

As will be apparent from the preceding tabulation, Example 4 (utilizing MDNO and sulfur as the crosslinking agents but free of accelerator and SBR reinforcing agent) exhibits superior tensile and tear properties as compared with Comp. Prep. D. (utilizing a peroxide and sulfur as crosslinking agents, but otherwise identical). Moreover, notwithstanding the increase of tensile and tear properties, the tensile modulus values remained low.

Comparison of Natural Rubber Films Crosslinked with MDNO (Examples 5-6) with Natural Rubber Films Crosslinked with Dicumyl Peroxide (Comparative Preparations E-F)

EXAMPLE 5

Comparative Preparation E

Comparison of Natural Rubber Latices Plus an SBR Reinforcing Agent Cured with MDNO (Example 5) and Dicumyl Peroxide (Comp. Prep. E) Crosslinking Agents

TABLE 9

MDNO and Peroxide-Cured Natural Rubber Films

|  | Example 5 | | Comp. Prep. E | |
|---|---|---|---|---|
| Ingredient | % TSC | Parts by Weight (Dry) | % TSC | Parts by Weight (Dry) |
| Centex HF NRL | 61.3 | 100 | 61.3 | 100 |
| Styrene Butadiene Rubber Latex (SBR) | 52.4 | 5 | 52.4 | 5 |
| MDNO Dispersion | 30 | 1.4 | — | — |
| Dicumyl Peroxide Emulsion | — | — | 37 | 1.4 |
| Darvan WAQ surfactant | 30 | 0.5 | 30 | 0.5 |
| Cab-O-Sperse GP-50 Aqueous Silica Dispersion | 20 | 2 | 20 | 2 |
| Antioxidant Dispersion | 50 | 2 | 50 | 2 |
| Deionized Water - as necessary to dilute compound to 45% TSC | | | | |

TABLE 10

Comparison of Tensile Properties of MDNO and Peroxide Cured Natural Rubber Films

| Property | Example 5 | Comp. Prep. E |
|---|---|---|
| Tensile Modulus | | |
| 50% | 74 | 70 |
| 100% | 112 | 112 |
| 300% | 273 | 304 |
| 500% | 1084 | 1235 |
| Ultimate Tensile Strength (psi) | 5463 | 4141 |
| Increase in Tensile Strength (Ex. 5 vs Comp. Prep. E) | 31.92% | — |
| Ultimate Percent Elongation (%) | 820 | 666 |
| Tear Strength (kN/m) | 41.1 | 13.1 |
| Increase in Tear Strength (Ex. 5 vs Comp. Prep. E) | 213.7% | — |

As will be apparent from the preceding tabulation, Example 5 (utilizing natural rubber and an MDNO crosslinking agent with a conventional SBR reinforcing agent but free of accelerator) exhibits superior tensile and tear properties as compared with Comp. Prep. E (utilizing natural rubber and a peroxide crosslinking agent, but otherwise identical). Moreover, notwithstanding the increase of tensile and tear properties, the tensile modulus values remained low.

EXAMPLE 6

Comparative Preparation F

Comparison of Natural Rubber Latices Cured with MDNO (Example 6) and Dicumyl Peroxide (Comp. Prep. F) Crosslinking Agents

TABLE 11

MDNO and Peroxide-Cured Natural Rubber Films

|  | Example 6 | | Comp. Prep. F | |
|---|---|---|---|---|
| Ingredient | % TSC | Parts by Weight (Dry) | % TSC | Parts by Weight (Dry) |
| Centex HF NRL | 61.3 | 100 | 61.3 | 100 |
| MDNO Dispersion | 30 | 1.4 | — | — |
| Dicumyl Peroxide Emulsion | — | — | 37 | 1.4 |
| Darvan WAQ surfactant | 30 | 0.5 | 30 | 0.5 |
| Cab-O-Sperse GP-50 Aqueous Silica Dispersion | 20 | 2 | 20 | 2 |
| Antioxidant Dispersion | 50 | 2 | 50 | 2 |
| Deionized Water - as necessary to dilute compound to 45% TSC | | | | |

TABLE 12

Comparison of Tensile Properties of MDNO and Peroxide Cured Natural Rubber Films

| Property | Example 6 | Comp. Prep. F |
|---|---|---|
| Tensile Modulus | | |
| 50% | 56 | 56 |
| 100% | 82 | 91 |
| 300% | 158 | 212 |
| 500% | 471 | 604 |
| Ultimate Tensile Strength (psi) | 4857 | 3893 |
| Increase in Tensile Strength (Ex. 6 vs Comp. Prep. F) | 24.8% | — |
| Ultimate Percent Elongation (%) | 907 | 718 |
| Tear Strength (kN/m) | 32.8 | 13.0 |
| Increase in Tear Strength (Ex. 6 vs Comp. Prep. F) | 152.3% | — |

As will be apparent from the preceding tabulation, Example 6 (utilizing MDNO as the crosslinking agent but free of accelerator) exhibits superior tensile and tear properties as compared with Comp. Prep. F (utilizing a peroxide as crosslinking agent, but otherwise identical). Moreover, notwithstanding the increase of tensile and tear properties, the tensile modulus values remained low.

EXAMPLE 7

Influence of a Maturation Period on Physical Properties of Film Product of Example 1

This example illustrates test films prepared from the aqueous latex of Example 1, but with a maturation period of 24 hours at room temperature prior to formation of the films. A comparison of the tensile properties of the test films prepared with (Comp. Prep. G) and without (Example 1) a maturation period are shown in Table 13.

TABLE 13

Demonstration of Undesirable Pre-vulcanization from Maturation.

| | Modulus Values (PSI) | | | | Ultimate Tensile Strength (PSI) | Ultimate Elongation (%) | Tear Strength (kN/m) |
|---|---|---|---|---|---|---|---|
| | 50% | 100% | 300% | 500% | | | |
| Example 1 | 66 | 91 | 164 | 257 | 4911 | 1124 | 36.2 |
| Comp. Prep. G (Films prepared after 24 hours standing at room temperature) | 62 | 92 | 168 | 270 | 2179 | 995 | 18.3 |

EXAMPLE 8

Dental Dams Formed by Casting Techniques

Dental dams were formed from the compounds used in Examples 1 and Comp. Prep. C. Rather than being dip-molded, as in Example 1, the dental dams were formed by casting the compounded latex onto thin flat sheets of stainless steel. The dental dams were vulcanized by essentially the same method as that of Example 1. The resulting dental dams were compared for taste and odor. The rubber dam made with the formulation of Comparative Preparation C had an odor and a detectable taste. The rubber dam made from the formulation of Example 1 did not have any detectable taste or odor.

EXAMPLES 9-11

Condom Films Prepared by Imbibition

A batch of latex was compounded as described in Example 1, except that MDNO was eliminated from the formulation. Latex condom shaped films were prepared by the same method as that of Example 1. Upon drying, the condom film was not vulcanized. Instead, a dry gel of synthetic polyisoprene compound was deposited on the former.

A solution containing 1% by weight MDNO and 99% by weight toluene was prepared. Immediately after removal from the drying oven, the dry gel on the closed end of the condom former was immersed in the toluene/MDNO solution. The film was allowed to dwell in this solution for 60 seconds, after which it was removed.

It was apparent that the solution had swelled, but not dissolved the rubber. The condom former was then placed in a hot air oven set to 150° F. for one hour to drive off the toluene and promote the vulcanization of the rubber. The former was allowed to cool down to room temperature, and the condom was removed from the former.

This procedure was repeated two more times, forming three films for tensile testing (Examples 9-11). Table 14 shows the results of the physical property testing, per ASTM D-3492.

TABLE 14

Tensile Properties of Condoms from MDNO Imbibed Polyisoprene Tensile Results

| Example | 50% Modulus Values (PSI) | 100% Modulus Values (PSI) | 300% Modulus Values (PSI) | 500% Modulus Values (PSI) | Ultimate Tensile Strength (PSI) | Ultimate Percent Elongation |
|---|---|---|---|---|---|---|
| 9 | 73 | 103 | 194 | 324 | 4078 | 1049 |
| 10 | 75 | 104 | 199 | 341 | 5036 | 1058 |
| 11 | 78 | 118 | 226 | 397 | 5172 | 1003 |
| MedianValues | 75 | 104 | 199 | 341 | 5036 | 1049 |

The film products of Examples 9-11 were transparent, and devoid of taste, odor and color.

EXAMPLES 12-13

Polyisoprene Condoms Formed from Pre-Cooled Rubber Compound

Two batches of synthetic polyisoprene latex were compounded as described in Example 1. Multiple sets of latex condoms were prepared by the same method as that of Example 1 at time intervals of 0.75 hours, 7.5 hours, 24.5 hours, and 31.5 hours, all in relation to initial time (t=0) corresponding to formulation time.

During the time intervals between the film preparation of the respective film products, one batch of latex was stored at room temperature and the second was stored in a bath of ice and water at approximately. 0° C. Once dipped, the films were processed in the same manner as Example 1.

This technique was utilized to produce films for tensile testing. The annexed figure and tables 16 and 17 show the results of physical property testing, per ASTM D3492, as a function of preparation time. As may be seen, placing the formulated latex into an ice bath prior to use is an effective way to slow down the pre-vulcanization of the compounded latex. It is clear that pre-vulcanization occurs in the liquid latex by noting the continually increasing 100% modulus value of the test specimens cut from the resulting condoms, which is an indicator of overall cure levels. However, the tensile strengths of the test films from the condoms drop over time, due to the undesirable nature of pre-vulcanization.

TABLE 16

Physical Property Data for Rubber Compounded at 0° C. (Example 12)

| Time Interval after compounding | Latex Aged in Ice Bath | | | | Ultimate Tensile Strength (PSI) | Ultimate Percent Elongation (%) |
|---|---|---|---|---|---|---|
| | Modulus Values (PSI) | | | | | |
| (hours) | 50 | 100 | 300 | 500 | | |
| 0.75 (Baseline) | 58 | 84 | 155 | 241 | 4961 | 1168 |
| 7.5 | 60 | 85 | 155 | 247 | 3739 | 1106 |
| 24.5 | 58 | 85 | 152 | 239 | 3334 | 1109 |
| 31.5 | 57 | 83 | 153 | 241 | 2939 | 1086 |

TABLE 17

Physical Property Data for Rubber Compounded at 25° C. (Example 13)

| Time Interval after compounding | Latex Aged at Room Temperature | | | | Ultimate Tensile Strength (PSI) | Ultimate Percent Elongation (%) |
|---|---|---|---|---|---|---|
| | Modulus Values (PSI) | | | | | |
| (hours) | 50 | 100 | 300 | 500 | | |
| 0.75 (Baseline) | 58 | 84 | 155 | 241 | 4961 | 1168 |
| 7.5 | 59 | 86 | 161 | 256 | 3312 | 1078 |
| 24.5 | 64 | 91 | 164 | 264 | 2112 | 987 |
| 31.5 | 67 | 99 | 176 | 276 | 2107 | 991 |

EXAMPLE 14

MDNO Addition in a Coagulant Bath

A batch of latex was compounded as in Example 1, except that MDNO was eliminated from the formulation. A 10-20% calcium nitrate coagulant bath was prepared with 0.5% Igepal CO-630 surfactant and 1.03.0% MDNO.

Latex condoms were prepared by the same method as that of Example 1. except that the coagulant provided the source of MDNO. This method is advantageous because the MDNO is separated from the rubber until the rubber is processed.

EXAMPLE 15

Post-Drying Coagulant Dip

An additional example utilizing MDNO in the coagulant involves a post latex coagulant dip. The same procedure from above was used except that upon removal from the latex tank the formers were dried for 5 minutes in a 150° F. oven and readied for an additional coagulant dip with MDNO.

The additional coagulant dip was conducted post-latex preparation utilizing a similar dipping profile as that used in the first coagulant dip. Condom formers were then placed in a 150° F. oven for 1 hour, leached for approximately 5 minutes in a 55° F. water bath and dried. This method produces a more evenly cured film than Example 14.

EXAMPLE 16

Multiple Coagulant/Latex Dipping Techniques

An additional example, applying MDNO in the coagulant involves two or more coagulant and latex dip combinations. The following table shows the results for physical property testing, per ASTM D-3492.

TABLE 18

Physical Property Data for Multiple Coagulant Dips

| Film Properties | Values |
|---|---|
| Modulus @ 50% Elongation (psi) | 44 |
| Modulus @ 100% Elongation (psi) | 68 |
| Modulus @ 500% Elongation (psi) | 142 |
| Median Tensile Strength (psi) | 2286 |
| Percent Elongation (%) | 1331 |
| Average Swell Percent (%) | 94.0 |

EXAMPLE 17

Straight Dip Molding Method with MDNO Bath

A batch of latex was compounded as in Example 1, except that MDNO was eliminated from the formulation and no deionized water was added. A 0.5-3.0% MDNO bath was prepared by adding an MDNO dispersion to deionized water. Latex condom-shaped films were prepared via the straight dip molding method.

Formers were dipped into the MDNO bath and dried for 5 minutes in a 150° F. oven or until dry. The formers were cooled before being dipped into the latex. Latex films were then roll dried and placed in a 150° F. oven. This technique was repeated until the desired film thickness was achieved. Formers were dipped into the MDNO bath for a final dip and dried for 1 hour in a 150° F. oven or kept at room temperature for 24 hours for curing.

EXAMPLE 18

Straight-Dipping in an Organic Solvent Bath

MDNO was dissolved in a suitable solvent in 0.5-3.0% concentration. Latex condom-shaped films were prepared via the straight dip molding method of Example 17 except using a solvent-based bath.

EXAMPLE 19

Casting Alternating Layers of Rubber and MDNO

A batch of latex was compounded as in Example 1, except that MDNO was eliminated from the formulation. Films were prepared by alternating layers of MDNO and rubber. A layer of an MDNO dispersion or MDNO dissolved in solvent was cast in a tray and then dried in al 50° F. oven for 5 minutes. Latex was then coated over the MDNO and dried in a 150° F. oven for 5 minutes. This procedure was repeated until desired thickness was achieved. Films were cast with an additional layer of NDNO and dried for 1 hour in a 150° F. oven or kept at room temperature for 24 hours for curing.

EXAMPLE 20

Solvent (Non-Latex) Casting Method

A solvent-based rubber system was prepared by dissolution of rubber in a suitable solvent to a concentration of 10-20% solids. MDNO dissolved in a solvent was cast in a tray then dried in a 150° F. oven for 5 minutes. A rubber solution was then coated over MDNO and dried in the 150° F. oven for 5 minutes. This procedure was repeated until the desired thickness was achieved. Films were cast with an additional layer of MDNO and dried for 1 hour in a 150° F. oven or kept at room temperature for 24 hours for curing.

EXAMPLE 21

Procedure for Dipping Surgical Glove, Examination Glove, Catheter Balloon, Infuser Balloon, or Breathing Bag A synthetic polyisoprene latex was formulated as in Example 1. The formulation was rolled for 15-30 minutes prior to use.

Products, including surgical gloves, examination gloves, catheter balloons, infuser balloons and breathing bags were prepared via the coagulant dip molding method. Mandrels were heated to 150° F. before being dipping into the coagulant. The mandrels were dried for 5 minutes in a 150° F. oven and dipped into the latex solution. The formers were dried for 5-10 minutes in the 150° F. oven and leached for 3 minutes in a 131° F. water bath. The formers were dried for 1 hour in the 150° F. oven or kept at room temperature for 24 hours for curing.

The products were stripped with the use of powder. All products were fully vulcanized and functional.

EXAMPLE 22

Latex Gloves Formed by Continuous Dipping

Synthetic polyisoprene latex was prepared by the same method as that of Example 1 for a continuous glove dipping operation. As glove formers are processed through the dipping tank, a measurable quantity of latex is removed. Newly compounded latex is continually added into the dipping tank in quantities that closely or nearly equal the amount of latex that is being removed on the glove dipping formers.

This technique keeps the volume of latex in the dipping tank nearly constant, while continually replacing aging latex. In doing so, the latex in the dipping tank is refreshed at a given rate, keeping the residence time for the compounded latex very short, allowing for only a small amount of pre-vulcanization.

The glove made in this example is a standard size 6½ latex surgical glove which has a weight of about 12.5 grams. The volume of latex, at 45% total solids content (TSC), used to produce this glove is 30 mL.

In the example, 30 mL of latex is added to the dipping tank for each dipped glove former that is removed from the tank. Once dipped, the glove former proceeds along the glove-dipping machine, which carries out the essential latex article processing steps described in Example 1. At the end of the line, the glove is stripped from the former and the resulting glove is fully vulcanized with excellent properties.

A dipping tank that can accommodate 25 glove formers at any given time has dimensions of 20" long with a height of 12". This tank has a filled volume of 4800 in$^3$. Given this volume, each former dipped removes 0.0375% of the total volume. At this rate, one tank volume worth of latex is used for every 2667 glove former dipped. 100 glove formers are dipped per minute resulting in one tank volume being added every 27 minutes. Accordingly, for every 2.3 tank volumes removed and replenished, only 10% of the original volume of latex remains. This translates into 90% of the original latex being removed every 62 minutes. This prevents the latex from reaching an unacceptable state of pre-vulcanization.

As shown in Table 19, the average age of the latex in the tank reaches steady state conditions after about 248 minutes (4 hours), and remains indefinitely at an average age of 37.89 minutes.

TABLE 19

Average Latex Age in Dipping Tank

| Time (minutes) | Average Age (minutes) |
|---|---|
| 0 | 0.00 |
| 62 | 34.10 |
| 124 | 37.51 |
| 186 | 37.85 |
| 248 | 37.89 |
| 310 | 37.89 |
| 372 | 37.89 |
| 434 | 37.89 |
| 496 | 37.89 |
| 558 | 37.89 |
| 620 | 37.89 |

EXAMPLE 23

Alternative Continuous Dipping Operation

A continuous glove dipping operation is performed as in Example 22 except that the latex compound used for the continuous dipping operation does not contain MDNO.

Uncompounded latex is added on a continuous or intermittent basis, and an MDNO dispersion is added separately. The MDNO may also be added on a continuous or intermittent basis so as to keep a constant and optimal ratio of MDNO and uncompounded latex in the dipping tank.

EXAMPLE 24

Addition of Microencapsulated MDNO to a Latex Compound

The addition of microencapsulated MDNO particles to a latex compound will allow for controlled release of the MDNO, which will extend the useful lifetime of the latex.

The MDNO microencapsulated particles are prepared by making a 50% MDNO in wax solution. 50.0 g of paraffin wax is heated to 150° F., and then 50.0 g of MDNO is added. The solution is stirred until all of the MDNO dissolves. The wax is cooled and ground up into small particles.

A 15% MDNO wax dispersion is prepared by combining 90.0 g of the 50% MDNO in wax solution, 3.1 g of Darvan # 1, 2.4 g of Van Gel B (a processed magnesium aluminum silicate available from Vanderbilt Chemical Company, Norwalk, Conn.) 0.7 g of Igepal CO-630, and 204.0 g of deionized water. All ingredients are mixed on a ball mill for 3 hours. The latex is compounded as described in Example 1, except that 1.2 phr MDNO is added in the form of microencapsulated particles. The latex films are prepared by heating mandrels to 150° F. and dipping into the coagulant. The mandrels are dried for 5 minutes in a 150° F. oven and dipped into the latex solution. Films are dried for 5-10 minutes in a 150° F. oven and leached for 3 minutes in a 131° C. water bath. The films are dried for 1 hour in a 150° F. oven.

The elevated temperature allows for a controlled release of the MDNO from the wax to begin the curing process. The films are then stripped with powder and readied for tensile testing. The dipping procedure is repeated each day to show the aging properties of the latex. The latex formulation is stored in an ice bath and rolled for 15 minutes prior to dipping.

Table 20 shows the expected result for latex films formulated with microencapsulated MDNO.

TABLE 20

Expected Physical Properties of Microencapsulated MDNO Latex Films.

| Days Latex Aged | Control: MDNO Dispersion | Microencapsulated MDNO |
|---|---|---|
| 0 | 4960 psi | 4960 psi |
| 1 | 3940 psi | 4960 psi |
| 2 | 3230 psi | 4960 psi |
| 22 | 1740 psi | 4960 psi |

As can be seen from the foregoing description, it is very clear that polynitrile oxide can be used in accordance of the present invention to produce both natural rubber and synthetic polyisoprene dip-molded film products, which have superior tensile strength, tear strength, and elongation properties.

The present invention is not limited in scope by the specific embodiments described herein. Indeed, various modifications of the invention in addition to those described herein will become apparent to those skilled in the art from the foregoing description and the accompanying figures. Such modifications are intended to fall within the scope of the appended claims. It is further to be understood that all values given in the foregoing examples are approximate, and are provided for purposes of illustration.

Patents, patent applications, publications, product descriptions, and protocols which are cited throughout this application are incorporated herein by reference in their entireties for all purposes.

This invention claimed is:

1. A thin walled, dip-molded or cast rubber film product of a natural rubber or synthetic cis-1,4-polyisoprene rubber compound crosslinked with a polynitrile oxide crosslinking agent, said product having a tear strength of from about 15 kN/m to about 60 kN/m, and a tensile strength of from about 1700 psi to about 6000 psi.

2. The thin walled rubber film product of claim 1, having the crosslinked structure of formula (I);

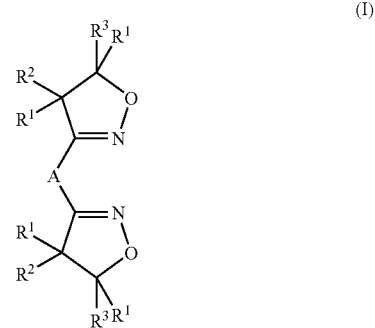

wherein,
A represents an aryl group substituted by a bulky group in at least one ortho position to the isoxazoline rings,
the aromatic structure having a ratio of hydrogen atoms to carbon atoms of less than 1:1 and,
the bulky group being substantially unreactive with a nitrile oxide functionality;
$R^1$ represents the natural rubber or cis-1,4-polyisoprene rubber polymer chain;
$R^2$ and $R^3$ are independently selected from hydrogen and methyl wherein;
when $R^2$ is methyl, $R^3$ is hydrogen and,
when $R^3$ is methyl, $R^2$ is hydrogen.

3. The thin walled rubber film product of claim 2, wherein the crosslinked chemical formula comprises:

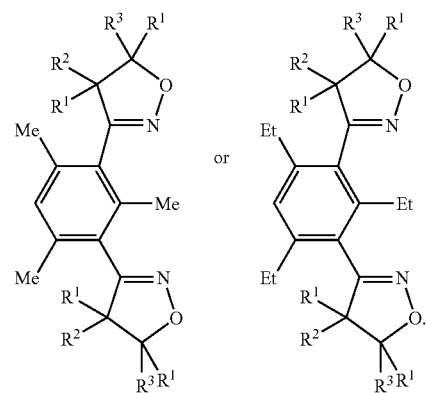

4. The thin walled rubber film product of claim 1, free of any sulfur-containing accelerators and free of any nitrosatable substances.

5. The thin walled rubber film product of claim 1, wherein the product is a surgical or examination glove, a catheter balloon, a condom or a dental dam.

6. The thin walled rubber film product of claim 1, prepared by compounding the rubber, forming the product and curing the rubber while reducing or eliminating pre-vulcanization of the rubber compound.

7. A thin walled, dip-molded or cast natural rubber or synthetic cis-1,4-polyisoprene rubber film product prepared by:
(a) compounding a natural rubber or synthetic cis-1,4-polyisoprene rubber so as to substantially reduce or prevent pre-vulcanization of the resulting rubber compound;

(b) dip-molding or casting the rubber compound to form the thin-walled rubber film product;
(c) admixing the rubber compound or thin walled film product with at least one polynitrile oxide crosslinking agent; and
(d) curing the rubber compound to produce crosslinking therein;
the film product having a tear strength of from about 15 kN/m to about 60 kN/m, and a tensile strength of from about 1700 psi to about 6000 psi.

8. The thin walled rubber film product of claim 7, substantially free of any sulfur-containing accelerators and free of any nitrosatable substances.

9. The thin walled rubber film product of claim 7, wherein the product is a surgical or examination glove, a catheter balloon, a condom or a dental dam.

* * * * *

UNITED STATES PATENT AND TRADEMARK OFFICE
CERTIFICATE OF CORRECTION

| | |
|---|---|
| PATENT NO. | : 7,294,678 B2 |
| APPLICATION NO. | : 11/045938 |
| DATED | : November 13, 2007 |
| INVENTOR(S) | : Mark W. McGlothlin et al. |

It is certified that error appears in the above-identified patent and that said Letters Patent is hereby corrected as shown below:

On the title page, item [75]:

In the Inventor Name:

Please delete "Whitney A. Williams" and substitute --Whitney Williams Ginter--

Signed and Sealed this

First Day of April, 2008

JON W. DUDAS
*Director of the United States Patent and Trademark Office*

UNITED STATES PATENT AND TRADEMARK OFFICE
CERTIFICATE OF CORRECTION

PATENT NO. : 7,294,678 B2  Page 1 of 1
APPLICATION NO. : 11/045938
DATED : November 13, 2007
INVENTOR(S) : Mark W. McGlothlin et al.

It is certified that error appears in the above-identified patent and that said Letters Patent is hereby corrected as shown below:

Title Page, Item (73) Assignee:

Delete "REGENT MEDICAL LIMITED" and insert
--APEX MEDICAL TECHNOLOGIES, INC.--.

Signed and Sealed this

Twenty-sixth Day of August, 2008

JON W. DUDAS
*Director of the United States Patent and Trademark Office*